United States Patent [19]

Gregory

[11] Patent Number: 4,923,498
[45] Date of Patent: May 8, 1990

[54] METHOD FOR FORMING A GROOVE IN A GLASS TUBE

[75] Inventor: Jonathan M. Gregory, So Berwick, Me.

[73] Assignee: GTE Products Corporation, Danvers, Mass.

[21] Appl. No.: 405,922

[22] Filed: Sep. 11, 1989

[51] Int. Cl.$^5$ ............................................. C03B 27/04
[52] U.S. Cl. ........................................ 65/109; 65/277; 65/283
[58] Field of Search ................. 65/109, 227, 279, 283, 65/294

[56] References Cited

U.S. PATENT DOCUMENTS

| | | | |
|---|---|---|---|
| 1,948,560 | 2/1934 | Borneman | 65/109 |
| 3,263,852 | 8/1966 | Fridrich | 65/109 X |
| 4,582,523 | 4/1986 | Marcucci et al. | 65/109 |
| 4,585,468 | 4/1986 | Marcucci et al. | 65/277 |
| 4,818,266 | 4/1989 | Saehs et al. | 65/283 X |

Primary Examiner—Robert L. Lindsay
Attorney, Agent, or Firm—Carlo S. Bessone

[57] ABSTRACT

A method for forming a groove in a glass tube without contacting the glass tube in the groove region. The method includes the steps of rotating the glass tube about its longitudinal axis, heating a localized area of the glass tube where a groove is to be formed sufficiently to soften the glass tube in the localized area, stretching the glass tube along its longitudinal axis by a first distance sufficient to cause a reduction in the diameter of the glass tube in the localized area, and compressing the glass tube along its longitudinal axis by a second distance sufficient to produce a groove in the localized area. The glass tube is rotated during the steps of heating, stretching and compressing the glass tube. Heating is preferably performed by directing the flames from one or more torches at the groove area.

22 Claims, 6 Drawing Sheets

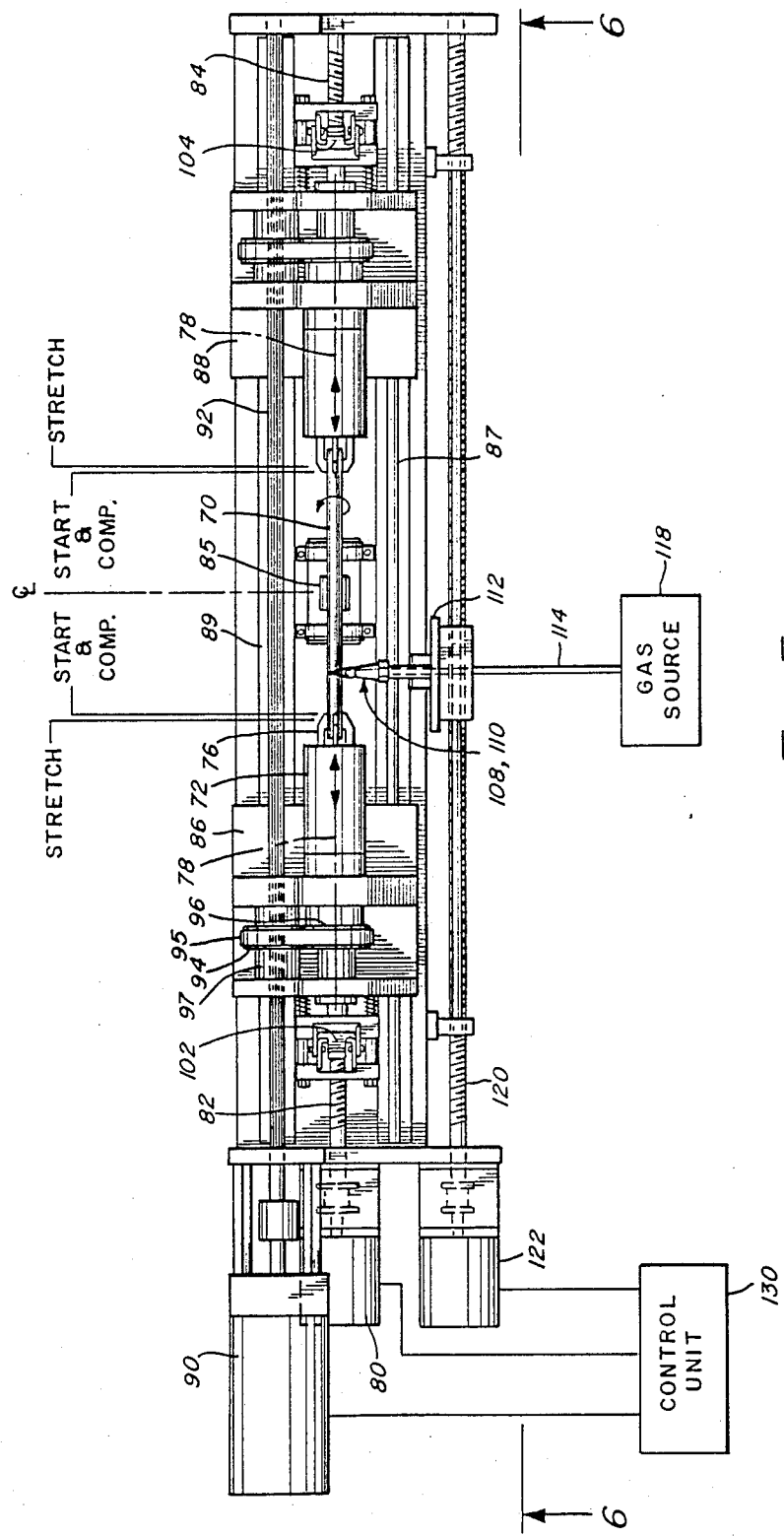

METHOD FOR FORMING A GROOVE IN A GLASS TUBE

CROSS REFERENCE TO RELATED APPLICATION

This application discloses, but does not claim, subject matter which is claimed in U.S. Ser. No. 405,923 filed Sept. 11, 1989 and assigned to the assignee of this application.

FIELD OF THE INVENTION

This invention relates to the field of glass working, and more particularly, to a method for forming a groove in a glass tube without physically contacting the glass tube in the groove region. The groove-forming method is typically utilized for forming grooves in electric lamp envelopes, but is not limited to such use.

BACKGROUND OF THE INVENTION

Low pressure discharge lamps, such as fluorescent lamps, include a tubular glass envelope which is usually linear or U-shaped. It has been found desirable to provide the glass tube with one or more grooves in order to increase the light output from the lamp. The use of such grooves is described, for example, in U.S. Pat. No. 4,582,523 issued Apr. 15, 1986 to Marcucci et al and U.S. Pat. No. 4,585,468 issued Apr. 29, 1986 to Marcucci et al. The grooves are formed such that both the inside diameter and the outside diameter of the glass tube are reduced in the groove area. Grooves may be also be formed in glass tubes for decorative purposes or for any other purpose.

The aforementioned Marcucci et al patents describe a groove-forming technique wherein a heated forming wheel is applied to the glass tube as it is rotated. The heated wheel can be used to form one groove at a time, or multiple, heated forming wheels can be utilized to provide multiple grooves simultaneously.

The technique which utilizes one or more heated forming wheels has various shortcomings. The forming wheel must be controlled at the proper temperature to avoid thermal cracks in the glass during grooving. Even if the wheel is maintained at a constant temperature, the glass must be slightly below its softening temperature at the edges of the wheel to insure proper groove shape. Because of the temperature gradient across the width of the groove, the glass is susceptible to thermal cracks. The temperature of the forming wheel must be a compromise between the optimum for the hottest area of the groove and for the relatively cool edges of the groove. If different shapes or groove dimensions are desired, new wheels must be machined, and the wheels on the groove-forming machine must be changed.

In addition, the forming wheel must rotate at the same speed as the glass tube when contact is made and throughout the groove forming process. It is difficult to control rotational speeds consistently in a production setting. The force and speed with which the forming wheel is pressed into the glass tube is critical because microcracks can be caused by excess pressure on the cooler groove edges. The pressure applied to the glass tube becomes more critical as the temperature gradient between the wheel and the glass increases. Thus, the glass is stressed both by pressure and thermal gradients. Finally, oxidation buildup from constant heating of the forming wheel requires special consideration with respect to wheel construction and maintenance.

It is a general object of the present invention to provide an improved method for forming a groove in a glass tube.

It is another object of the present invention to provide a noncontact method for forming a groove in a glass tube.

It is a further object of the present invention to provide a method for forming a groove in a glass tube wherein damage to the glass tube is minimized.

It is yet another object of the present invention to provide a method for forming a groove in a glass tube wherein the dimensions and shape of the groove can be changed without retooling.

It is still another object of the present invention to provide a method for forming a groove in a glass tube which is easily adaptable to high volume production.

SUMMARY OF THE INVENTION

According to the present invention, these and other objects and advantages are achieved in a method for forming a groove in a glass tube. The method comprises the steps of rotating the glass tube about its longitudinal axis, heating a localized area of the glass tube where a groove is to be formed sufficiently to soften the glass tube in the localized area, stretching the glass tube along its longitudinal axis by a first distance sufficient to cause a reduction in the diameter of the glass tube in the localized area, and compressing the glass tube along its longitudinal axis by a second distance sufficient to produce a groove in the localized area. The glass tube is rotated during the steps of heating, stretching and compressing the glass tube.

Preferably, heating of the glass tube is terminated before the step of stretching the glass tube. The step of compressing the glass tube is typically performed a predetermined time, on the order of one second or less, after the step of stretching the glass tube. Heating is preferably performed by directing the flame from one or more torches at the localized area of the glass tube. Preferably, the localized area is actively cooled after compressing the glass tube in order to provide rapid hardening of the glass tube in the groove area.

End portions of the glass tube are clamped in chucks, and the chucks are rotated at equal speeds. The step of stretching the glass tube is accomplished by pulling the chucks apart in an axial direction. The step of compressing the glass tube is accomplished by pushing the chucks toward each other in an axial direction.

When the first distance by which the glass tube is stretched is equal to the second distance by which the glass tube is compressed, a substantially constant wall thickness is maintained in the groove area. When the stretch distance is greater than the compression distance, a reduced wall thickness is obtained in the groove area. When the stretch distance is less than the compression distance, an increased wall thickness is obtained in the groove area.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 5 is a plan view of a machine for forming grooves in a glass tube;

DETAILED DESCRIPTION OF THE INVENTION

Figure 1:
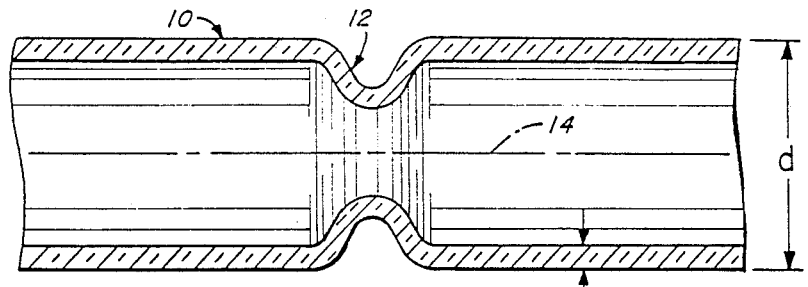
FIG. 1 is a cross-section of a glass tube in which a groove has been formed.

A cross-sectional view of a glass tube 10 having a groove 12 is shown in FIG. 1. The glass tube 10 typically has an outside diameter in the range of about ⅜ inch to one inch. The wall thickness t is typically in the range of about 0.025 inch to 0.070 inch. However, grooves can be formed in glass tubes having dimensions outside these ranges in accordance with the present invention. In the groove 12, both the outside diameter and the inside diameter of glass tube 10 are reduced. In a typical groove, the inside diameter is reduced by about one-half. The groove 12 can have a variety of shapes, depending on the parameters of the forming process as described hereinafter. In addition, the wall thickness t can be maintained constant, increased or decreased in the region of groove 12. The glass tube 10 has a longitudinal axis 14, and the groove 12 is concentric with axis 14. Multiple grooves can be formed at axially spaced-apart locations on glass tube 10.

The present invention provides a technique for forming groove 12 without the use of a heated wheel and without physical contact with the glass tube 10 in the region of groove 12. As a result, the disadvantages associated with the use of a heated forming wheel are eliminated.

Figure 2:
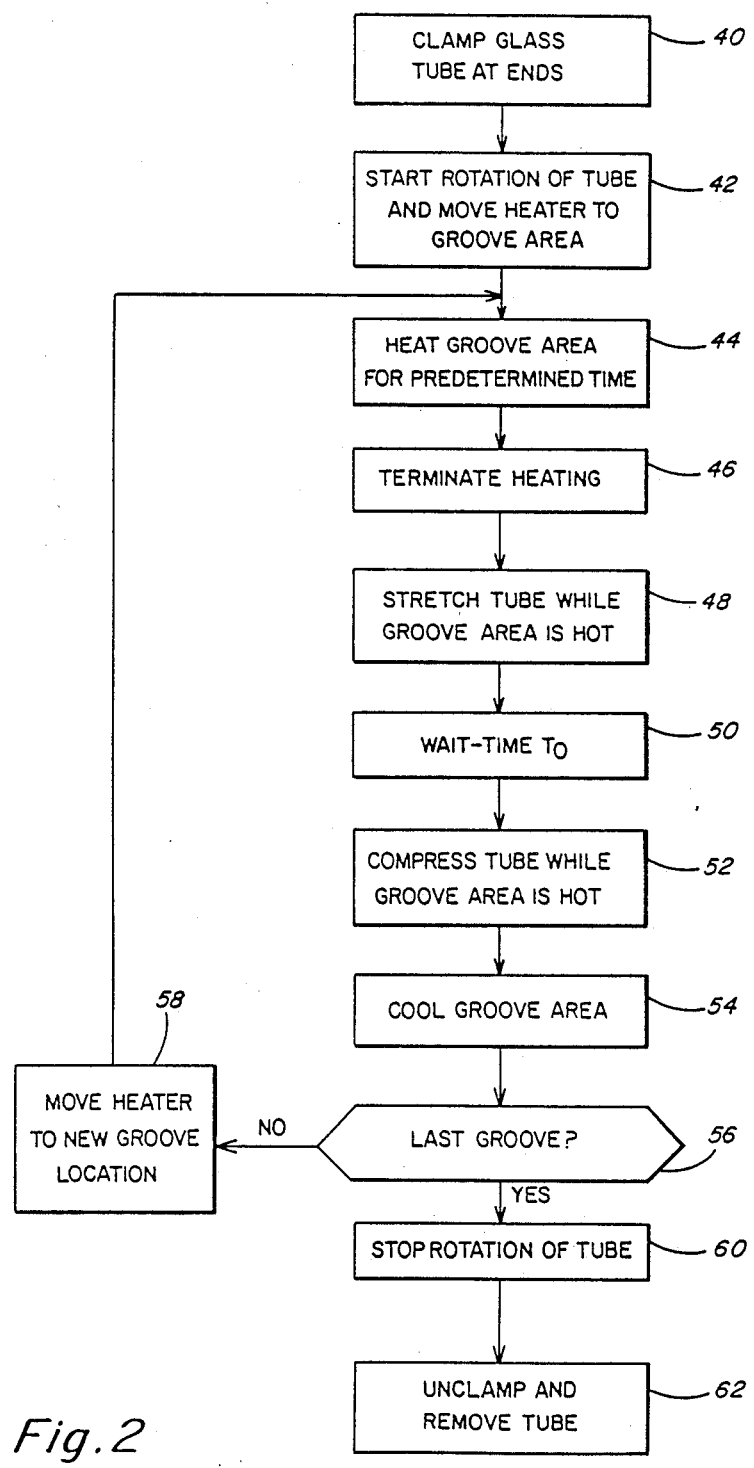
FIG. 2 is a flow chart showing the steps involved in formation of a groove in accordance with the present invention.

The technique for forming groove 12 is illustrated in the flow chart of FIG. 2. In step 40, the ungrooved glass tube is clamped at each end. The clamping should provide lateral support for the glass tube so that it will not sag or otherwise deform when the groove region is softened by heating. Glass chucks are preferably used for clamping, as described hereinafter. Next, the glass tube is rotated about its longitudinal axis in step 42, and a heater is moved to the area of the tube where a groove is desired. The tube 10 is rotated about longitudinal axis 14 for the remainder of the groove-forming steps. A typical rotation rate is about 200 RPM. However, other rotation rates can be utilized.

The groove area of the tube is then heated to above the softening temperature of the glass in step 44. The tube is preferably heated by one or more narrow burner flames, each produced by a torch and directed at the groove region. A narrow flame limits the softened region to the desired groove location. As the glass softens in the groove area, the chucks must insure that both ends of the glass tube rotate at exactly the same speed to avoid twisting. Also, the chucks must clamp each end of the glass tube in such a manner as to maintain the longitudinal axis 14 in a straight line when the heated area softens and the tube essentially becomes two parts for handling purposes. The amount of heat applied to the tube must be sufficient to soften the tube in the groove area without causing it to liquefy. The glass tube temperature in the groove area can be controlled by applying heat for a predetermined time, typically on the order of about 3–10 seconds depending on the dimensions of the tube and the intensity of the flame. Alternatively, the applied heat can be controlled in response to sensing the temperature of the glass tube in the groove area. When the glass in the groove area is sufficiently softened, heating is terminated in step 46.

Figure 3:
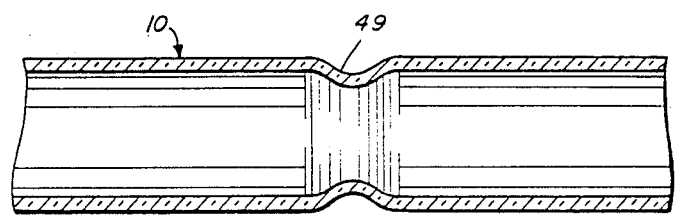
FIG. 3 is an illustration of a glass tube after axial stretching but before axial compression.

The tube 10 is then stretched axially in step 48 while the groove area is hot by pulling both ends of the tube axially and simultaneously. Rotation of the tube continues during stretching. When the tube is stretched, the glass in the heated groove area is reduced in diameter, as indicated in FIG. 3 by the reference number 49. The distance that the glass is stretched and the viscosity of glass in the heated area determine the reduction in diameter. Typically, the glass tube is stretched by about ¼ inch. However, other stretch distances can be utilized depending on the dimensions of the glass tube and the required parameters of the groove. The tube is maintained in the stretched position for a predetermined short wait time $T_0$ (step 50). The wait time $T_0$ is usually less than one second and is preferably about 200 milliseconds. Then, without reheating of the tube, but while the groove area is still hot, the tube is axially compressed in step 52 by pushing the ends of the tube together. The axial compression produces a well-defined groove in the heated groove area. The wait time $T_0$ permits partial cooling of the groove area before the tube is axially compressed and prevents the sides of the groove from fusing together. In cases where fusing of the groove sides is acceptable, the wait time $T_0$ can be omitted. The distance that the ends of the glass tube are pushed together affects the groove shape, tube wall thickness and final diameter of the groove 12.

After compression, the groove area can be actively cooled in step 54 to provide rapid solidification of the groove area. The active cooling step can be eliminated in cases where slower cooling is acceptable. In step 56, a determination is made whether the previously-formed groove was the last required groove. If another groove is required, the heater is moved in step 58 to a new groove location, and steps 44, 46, 48, 50, 52 and 54 are repeated at the new groove location. When the previously-formed groove was the last required groove, rotation of the tube is stopped in step 60, and the tube is unclamped and removed in step 62.

The active forced air cooling of step 54 is used to quickly increase the viscosity of the glass in the groove region in order to set the groove shape. A controlled and consistent cooling rate insures the repeatability of groove shapes and dimensions. Application of cooling air for approximately ½ second causes sufficient cooling to set the groove.

Figure 4A:
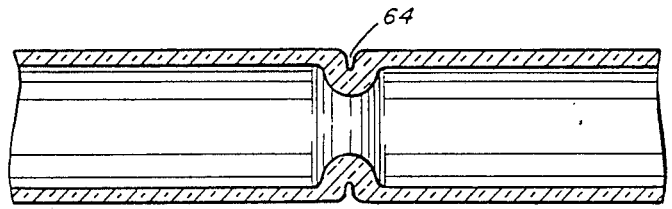
FIGS. 4A–4C are cross-sectional views of glass tubes having grooves formed in accordance with the present invention, for different relative push/pull distances.
Figure 4B:
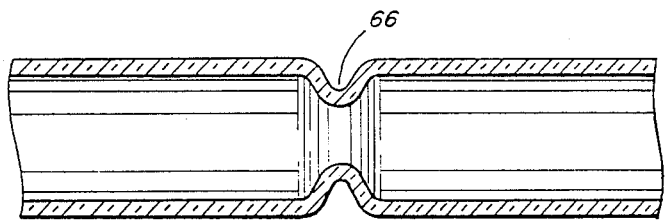
Figure 4C:
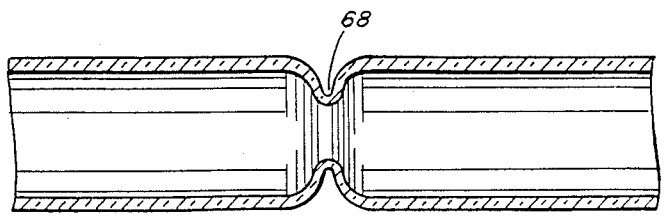

When the ends of the glass tube are pushed in by a greater distance than they are pulled out during the groove-forming process, the wall thickness in the groove area is increased and the inside diameter of the groove is reduced, as indicated by groove 64 in FIG. 4A. When the pull and push distances are equal, the tube wall thickness does not change in the groove area, as indicated by groove 66 in FIG. 4B. The groove shape and diameter can be adjusted by altering the amount of heating and thereby controlling the glass viscosity. The wall thickness is reduced in the groove region when the pull distance is greater than the push distance, as indicated by groove 68 in FIG. 4C.

Figure 6:
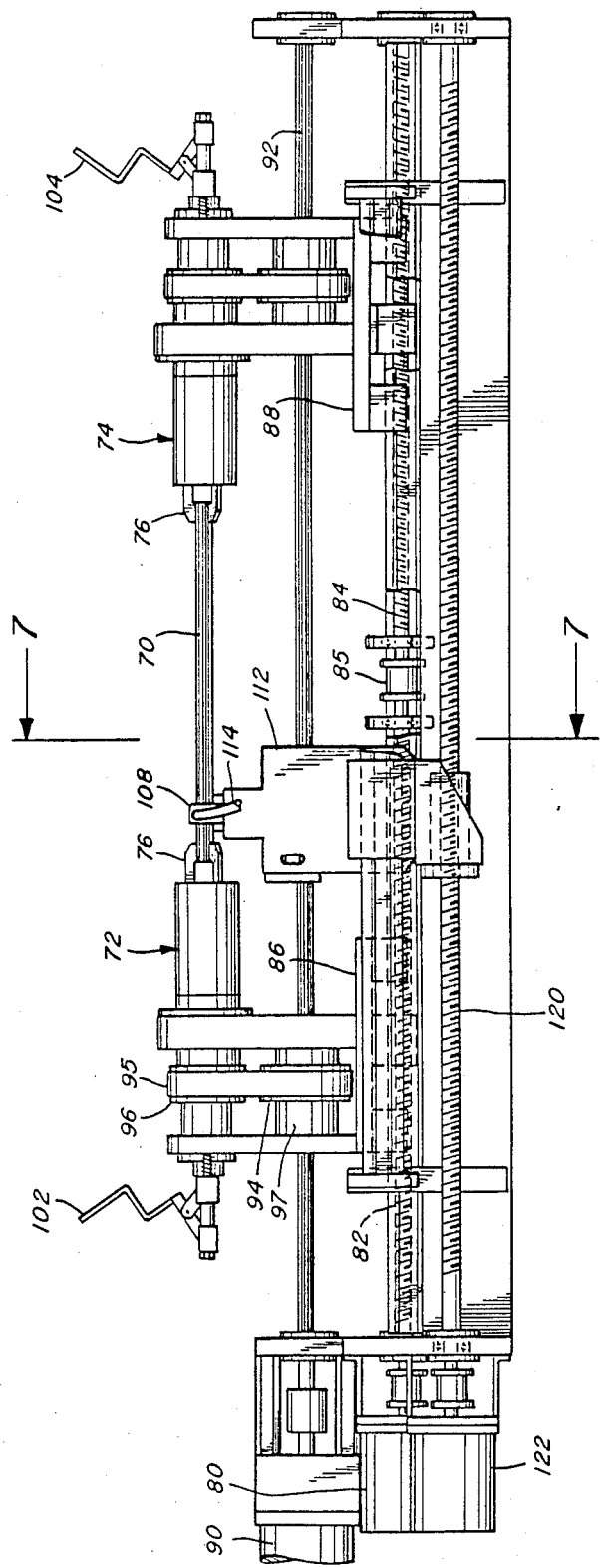
FIG. 6 is a partially broken-away plan view of the machine taken along the line 6—6 of FIG. 5.
Figure 7:
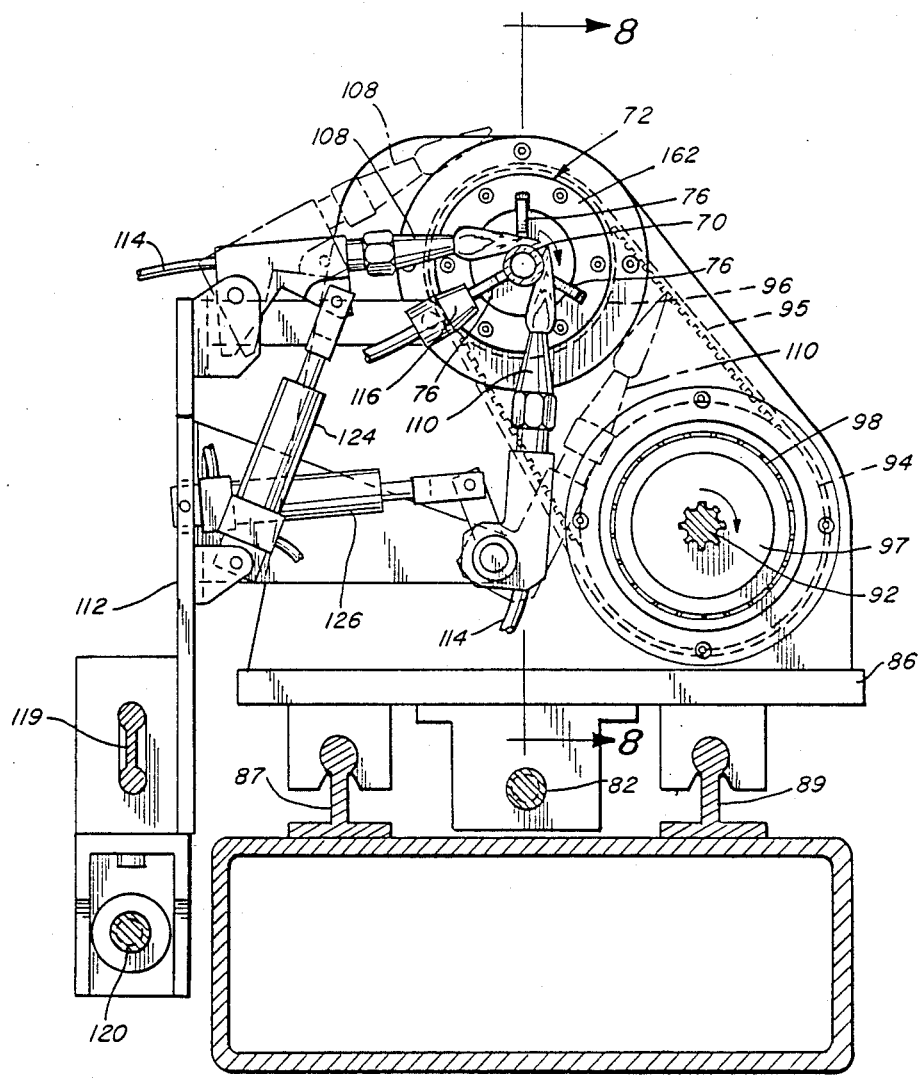
FIG. 7 is a cross-sectional view of the machine taken along the line 7—7 of FIG. 6.

An apparatus for forming grooves in a glass tube according to the method described above is shown in FIGS. 5–7. A glass tube 70 is clamped at each end by chucks 72 and 74 having jaws 76. The chucks 72 and 74 are axially movable along an axis 78, which is the longitudinal axis of glass tube 70. The apparatus is constructed so that axial movements of chucks 72 and 74 are equal in magnitude and opposite in direction. The chucks 72 and 74 can also be rotated about axis 78. The chucks 72 and 74 rotate in the same direction at equal speeds.

A stepper motor 80 is connected to a lead screw 82. The lead screw 82 is connected by a coupler 85 to a lead screw 84. The lead screws 82 and 84 are oppositely threaded to provide axial movement of chucks 72 and 74 in opposite directions when stepper motor 80 is energized. Chuck 72 is mounted on a carriage 86 having a ball nut coupled to lead screw 82. Chuck 74 is mounted on a carriage 88 having a ball nut attached to lead screw 84. The carriages 86 and 88 are axially movable along rails 87 and 89. When stepper motor 80 is energized, carriages 86 and 88 are moved along axis 78 toward each other or away from each other by lead screws 82 and 84, respectively.

The rotation of chucks 72 and 74 is controlled by a motor 90 connected to a spline shaft 92. A toothed pulley 94 mounted on spline shaft 92 and a toothed pulley 96 mounted to chuck 72 transmit rotation via a belt 95 from motor 90 to chuck 72. The pulley 94, which is mounted by a bearing 98 on a spline shaft follower 97, moves axially along spline shaft 92 with carriage 86. A similar set of pulleys interconnecting spline shaft 92 and chuck 74 cause rotation of chuck 74. The jaws 76 can be opened manually by levers 102 and 104, respectively, to release the glass tube 70.

Torches 108 and 110 are mounted on a carriage 112. The torches 108 and 110 are connected by a flexible tube 114 to a flammable gas source 118. An air cooling nozzle 116 is also mounted on carriage 112. The air nozzle 116 is connected by a flexible tube to a source of pressurized cooling air (not shown). The carriage 112 is axially movable along a rail 119 and is coupled by a ball nut to a lead screw 120. The lead screw 120 is connected to a stepper motor 122. When the stepper motor 122 is energized, the carriage 112 moves along lead screw 120 parallel to tube 70 for positioning of torches 108 and 110 and air nozzle 116 at the desired groove location on tube 70. Torches 108 and 110 are mounted to carriage 112 by air cylinders 124 and 126, respectively. The air cylinders 124 and 126 control movement of torches 108 and 110 between heating positions and retracted positions (shown in phantom in FIG. 7). When the torches 108 and 110 are in their respective heating positions, they are directed tangentially with respect to the glass tube 70 to provide rapid heating of the localized groove area.

The stepper motors 80 and 122, the motor 90, and the air cylinders 124 and 126 are energized by a programmable control unit 130. The control unit 130 causes the apparatus to execute the routine shown in FIG. 2 and described in detail hereinabove.

Figure 8:
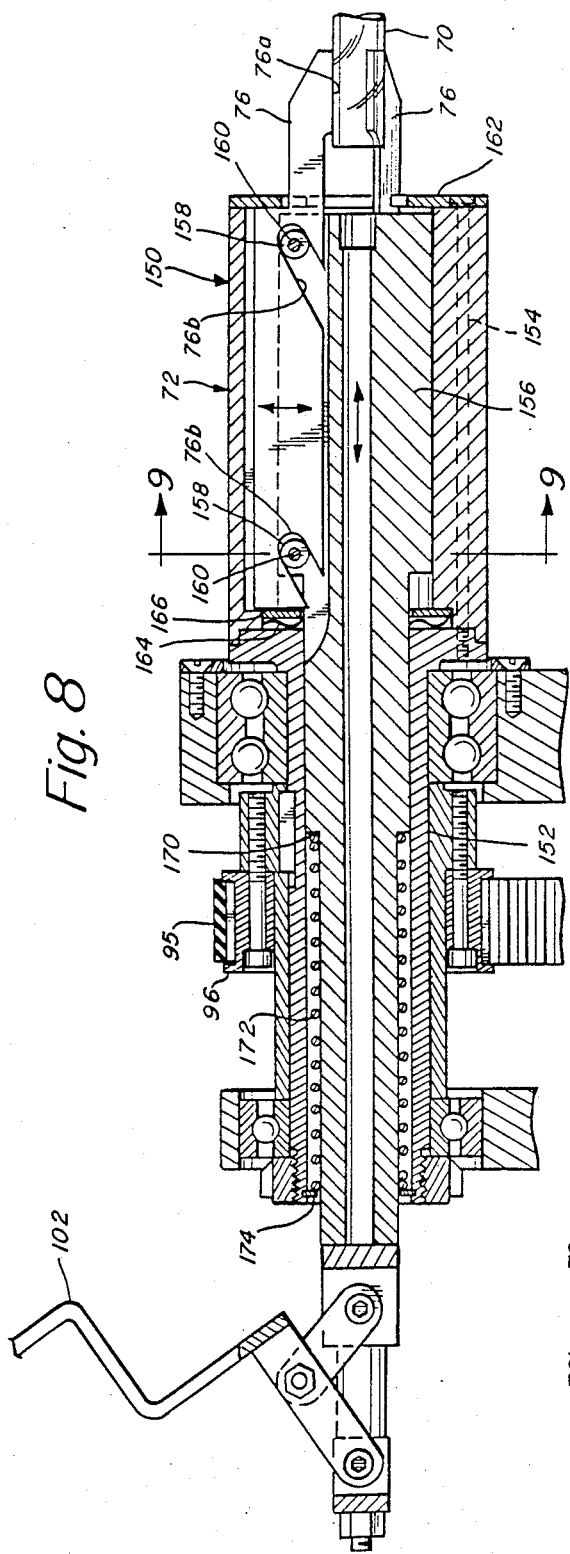
FIG. 8 is a cross-sectional view of the chuck for holding the glass tube taken along the line 8—8 of FIG. 7.
Figure 9:
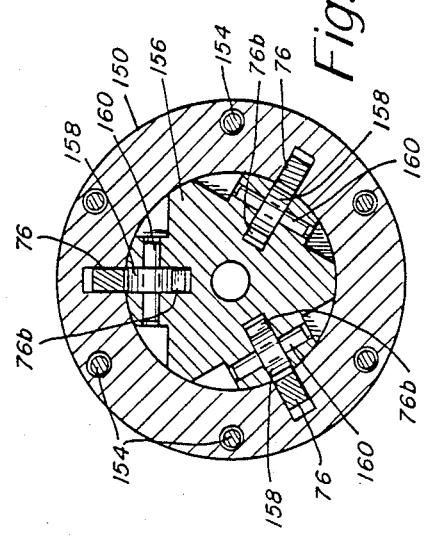
FIG. 9 is a cross-sectional view of the chuck taken along the line 9—9 of FIG. 8.

Cross-sectional views of the chuck 72 are shown in FIGS. 8 and 9. The chuck 74 is the same as chuck 72. The chuck includes three spring-activated jaws 76. The chuck is able to grasp and centralize glass tubes of different diameters with a predetermined clamping force. The glass tube is rigidly held as it is being rotated. A line contact is formed between an inside surface 76a of each jaw 76 and the glass tube. Three line contacts insure that the central portion of the glass tube does not collapse when the groove region is heated above the softening temperature of the glass. The chuck includes housing members 150 and 152 interconnected by bolts 154. A draw bar 156 is grooved and cross drilled to accept six free-turning rollers 158 and six hardened pins 160. Three hardened jaws 76 are positioned in grooves in housing member 150 and draw bar 156. A retainer plate 162 prevents lateral motion of jaws 76. A wave spring 164 and a hardened thrust washer 166 bear on the inner ends of jaws 76 to maintain contact between jaws 76 and retainer plate 162, while allowing radial movement of the jaws 76. The draw bar 156 is provided with a shoulder 170. A chuck-operating spring 172 bears against the shoulder 170 and a snap ring 174.

The draw bar 156 is retracted so that the operating spring 172 is compressed. Rollers 158, acting on inclined slots 76b in jaws 76, force the jaws to open so that the glass tube can be inserted. As the draw bar 156 is released, the operating spring 172 forces the draw bar forward, causing rollers 158 to transfer motion of the draw bar to jaws 76 through the lower edges of the slots 76b, thereby causing the jaws 76 to clamp the glass tube. The relatively long length of the operating spring 172 in comparison to the motion of the draw bar 156 produces a relatively small variation in clamping force for different diameter tubes.

In operation, the glass tube 70 is mounted in chucks 72 and 74 by manual operation of levers 102 and 104, and motor 90 is energized, thereby causing rotation of tube 70. The stepper motor 122 is energized, causing the carriage 112 to be positioned adjacent to the desired groove area on tube 70. Air cylinders 124 and 126 are then actuated, causing torches 108 and 110 to be moved to their heating positions for heating of the groove region of tube 70. After a predetermined heating time, torches 108 and 110 are retracted, and stepper motor 80 is energized in one direction, causing chucks 72 and 74 to pull the ends of tube 70 by a predetermined distance. After a predetermined wait time $T_0$, stepper motor 80 is energized in the opposite direction, causing chucks 72 and 74 to push the ends of glass tube 70 together. As a result, the desired groove is formed. Then air nozzle 116 is activated, causing cooling air to be directed at the groove region of glass tube 70. If additional grooves are required, the motor 122 is energized, causing carriage 112 to be moved to the new groove location. The above-described process is then repeated. After the required grooves have been formed in glass tube 70, the tube is removed from the chucks 72 and 74.

It will be understood that different configurations can be utilized for the groove-forming apparatus. The principal requirements of the apparatus are for a means for rotating the glass tube, a noncontact means for heating the groove region of the glass tube, and means for axial stretching and compression of the heated tube.

The groove forming technique of the present invention eliminates problems of cracking associated with use of the heated forming wheel, since the glass is not physically contacted in the groove region during groove formation. Grooves are formed using noncontact heating and axial forces at the cool ends of the glass tube. A wide variety of groove shapes and dimensions can be obtained without retooling merely by changing the heating times and the push/pull parameters. The tube wall thickness can be increased or decreased in the groove region by varying the relative push/pull distances. As a result, the strength of the bulb and the heat transfer characteristics in the groove region can be altered.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for forming a groove in a glass tube, comprising the steps of:
   rotating the glass tube about its longitudinal axis;
   heating a localized area of the glass tube where a groove is to be formed sufficiently to soften the glass tube in the localized area;
   stretching the glass tube along its longitudinal axis by a first distance sufficient to cause a reduction in the diameter of the glass tube in the localized area; and
   compressing the glass tube along its longitudinal axis by a second distance sufficient to produce a groove in the localized area, said steps of heating, stretching and compressing the glass tube being performed during rotation of the glass tube.

2. A method for forming a groove in a glass tube as defined in claim 1 wherein the step of heating the glass tube is terminated before the step of stretching the glass tube.

3. A method for forming a groove in a glass tube as defined in claim 1 wherein the step of compressing the glass tube is performed a predetermined time after the step of stretching the glass tube.

4. A method for forming a groove in a glass tube as defined in claim 1 wherein the step of heating the glass tube includes heating the glass tube with a burner flame.

5. A method for forming a groove in a glass tube as defined in claim 1 wherein the step of heating the glass tube includes heating the glass tube with a torch directed at the localized area.

6. A method for forming a groove in a glass tube as defined in claim 1 wherein the step of heating the glass tube includes heating the glass tube with two torches directed at the localized area.

7. A method for forming a groove in a glass tube as defined in claim 6 wherein the step of heating the glass tube is performed for about 3 to 10 seconds.

8. A method for forming a groove in a glass tube as defined in claim 3 wherein said predetermined time is about one second or less.

9. A method for forming a groove in a glass tube as defined in claim 1 further includes the step of actively cooling the localized area after the step of compressing the glass tube.

10. A method for forming a groove in a glass tube as defined in claim 1 wherein the step of rotating the glass tube includes rotating the glass tube at about 200 revolutions per minute.

11. A method for forming a groove in a glass tube as defined in claim 1 wherein the first distance by which the glass tube is stretched is approximately equal to the second distance by which the glass tube is compressed, thereby maintaining a substantially constant wall thickness of the glass tube in the localized area.

12. A method for forming a groove in a glass tube as defined in claim 1 further including the step of clamping end portions of the glass tube with chucks and wherein the step of rotating the glass tube includes rotating said chucks at equal speeds.

13. A method for forming a groove in a glass tube as defined in claim 12 wherein the step of stretching the glass tube includes pulling end portions of the tube by moving said chucks away from each other.

14. A method for forming a groove in a glass tube as defined in claim 12 wherein the step of compressing the glass tube includes pushing end portions of the tube by moving said chucks toward each other.

15. A method for forming a groove in a glass tube as defined in claim 1 wherein the first distance by which the glass tube is stretched is greater than the second distance by which the glass tube is compressed, thereby providing a reduced wall thickness in said localized area.

16. A method for forming a groove in a glass tube as defined in claim 1 wherein the first distance by which the glass tube is stretched is less than the second distance by which the glass tube is compressed, thereby providing increased wall thickness in said localized area.

17. A method for forming a groove in a glass tube as defined in claim 1 wherein the step of heating the glass tube is performed for a predetermined time.

18. A method for forming a groove in a glass tube as defined in claim 4 further including the step of retracting the burner flame from the glass tube after a predetermined time.

19. A method for forming a groove in a glass tube, comprising the steps of:
   clamping end portions of the glass tube;
   rotating the glass tube about its longitudinal axis;
   heating a localized circumferential area of the glass tube where a groove is to be formed sufficiently to soften the glass tube in the localized area;
   terminating heating of the glass tube;
   before substantial cooling of the glass tube, pulling said end portions of the glass tube along its longitudinal axis by a first distance sufficient to cause a reduction in the diameter of the glass tube in the localized area; and
   before the glass tube hardens, pushing end portions of the glass tube along its longitudinal axis by a second distance sufficient to produce a groove in the localized area, said steps of heating, pulling and pushing the glass tube being performed during rotation of the glass tube.

20. A method for forming a groove in a glass tube as defined in claim 19 wherein the step of pushing end portions of the glass tube is performed a predetermined time after the step of pulling end portions of the glass tube.

21. A method for forming a groove in a glass tube as defined in claim 19 wherein the step of heating the glass tube includes heating the glass tube with two torches directed at the localized area.

22. A method for forming a groove in a glass tube as defined in claim 19 further includes the step of actively cooling the localized area after the step of compressing the glass tube.

* * * * *